No. 666,012. Patented Jan. 15, 1901.
I. HIRSCH.
TABLE CUTLERY.
(Application filed Nov. 7, 1900.)
(No Model.)
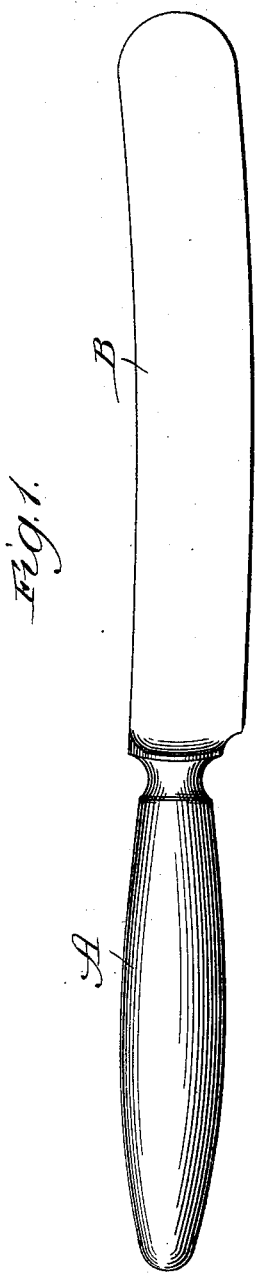
Witnesses:
Inventor:
Isaac Hirsch,
THE NORRIS PETERS CO., PHOTO-LITHO., WASHINGTON, D. C.

UNITED STATES PATENT OFFICE.

ISAAC HIRSCH, OF CHICAGO, ILLINOIS.

TABLE-CUTLERY.

SPECIFICATION forming part of Letters Patent No. 666,012, dated January 15, 1901.

Application filed November 7, 1900. Serial No. 35,739. (No model.)

*To all whom it may concern:*

Be it known that I, ISAAC HIRSCH, a citizen of the United States, residing at Chicago, in the county of Cook and State of Illinois, have invented a new and useful Improvement in Table-Cutlery, of which the following is a specification.

My invention relates to table-cutlery generally, and more especially to table-knives; and it consists in an improved article of manufacture, as well as a novel and improved method of manufacture.

My object is to provide a new method of producing and a new construction for table-knives and other articles of table-cutlery, particular attention being paid to the production of an article which is thoroughly substantial and perfect in construction.

In the accompanying drawings, which illustrate my invention and the mode in which it is carried out, Figure 1 represents a finished knife in side elevation; Figs. 2 and 3, sections from which the handle and bolster are formed; Fig. 4, a view in side elevation of the handle after the sections thereof have been welded together and before the handle has been finished by grinding or polishing; Fig. 5, a broken view of the heel or rear end of the blade; Fig. 6, a broken view illustrating the manner in which the blade is welded to the handle; Fig. 7, a broken section taken as indicated at line 7 of Fig. 6; Fig. 8, a transverse section taken as indicated at line 8 of Fig. 4; and Fig. 9, an end view of the handle, showing the manner in which the flattened portions of the bolster-sections lie side by side after the handle-sections are welded together.

A represents the handle of the knife, and B the blade thereof. The handle is formed of two sections or scales $a$, each of which is formed integrally with a bolster-section $a'$. The handle-sections are formed of sheet metal stamped to the desired shape. The handle-sections are preferably joined together by electrically welding them along their meeting edges, thereby producing a hollow handle. In the preferred form the sections are flattened in front of the bolster $a'$ and lie side by side, thereby producing a shoulder $a^2$. The blade B is formed with a butt or shoulder $b$, which corresponds approximately in cross-section to the shape of the cross-section of the two contiguous flattened portions $a^2$ of the handle. The blade is joined to the handle by butt-welding the same to the shoulder $a^2$, as illustrated in Fig. 7. The blade is preferably electrically welded to the handle, as are the handle-sections to each other.

After the handle-sections have been welded to each other and the blade then welded to the handle-sections the knife presents the appearance indicated in Fig. 6, which shows rough longitudinal burs or ribs $c\ c'$ and transverse burs or ribs $d$. To give the knife a finished surface preparatory to plating the same, where it is desired to supply a plating, the knife is ground all over and then presents a perfectly smooth appearance, no trace of the welding operation being visible. As thus described, the knife is very substantial and very light.

While it is desirable to form bolster-sections integral with the handle-sections and to flatten the bolster-sections at their front portions, this feature may be omitted without departure from my invention. It will be observed that in this construction the tang of the knife-blade is reduced to a mere stub, having a suitable shoulder or edge, which abuts against and is welded to the adjacent edges or shoulders of both the handle-sections. Since it is possible to produce perfectly tight joints by means of electric welding under the conditions present in this construction, it is impossible for any water to gain access to the interior of the handle.

The value of the new article of manufacture will be more evident when it is stated that in constructions where a tang separates the handle-sections it is impossible to effectually electrically weld the parts together. The reason why the parts cannot be successfully electrically welded in the old construction mentioned will be readily understood by those skilled in the art of electric welding. It is evident that the new article of manufacture has, in addition to its value arising from a reduction in weight, a value arising from economy in material, inasmuch as the long tang heretofore employed in constructions of this general character is dispensed with.

My invention is applicable to all kinds of table-cutlery, whether knives, forks, or steels, and by the term "blade" I intend to include the cutting portion of a knife, the pronged portion of a fork, or the sharpening portion of a steel.

What I claim as new, and desire to secure by Letters Patent, is—

1. The method of forming an article of cutlery, which consists in stamping the handle of desired form, providing the same with a blade-attaching shoulder, forming the blade with a short tang having a shoulder to abut against the corresponding shoulder of said handle, and welding said tang to the adjacent portion of said handle, substantially as described.

2. The method of forming an article of cutlery, which consists in stamping the handle in two concavo-convex sections, providing a blade-attaching shoulder at the front end thereof, forming the blade with a short tang to abut against the adjacent end of the handle and joining all said parts at their meeting surfaces by hermetically-sealed joints, substantially as described.

3. The method of forming an article of cutlery, which consists in stamping the handle in two longitudinal concavo-convex sections, electrically welding said sections at their meeting edges, thereby producing external longitudinal burs, forming the blade with a short tang, electrically welding said tang to the adjacent flattened portions of the handle-sections, thereby producing transverse burs, and then removing said burs, substantially as described.

4. As a new article of manufacture, a knife comprising a suitably-shaped handle provided at one end with a flattened blade-attaching shoulder and a separately-formed blade having a short tang abutting against and welded to said flattened portion of the handle, substantially as described.

5. As a new article, a knife comprising concavo-convex handle-sections joined together and having flattened blade-attaching portions lying side by side, and a blade having a short tang abutting against the shoulders afforded by said flattened portions and welded thereto, substantially as described.

6. As a new article of manufacture, a knife comprising a handle formed of two longitudinal sections, each of said sections having formed integral therewith a bolster-section, said bolster-sections having flattened portions lying side by side, and a blade having a short tang abutting against and welded to the adjacent edges of said flattened portions, substantially as described.

ISAAC HIRSCH.

In presence of—
 D. W. LEE,
 ALBERT D. BACCI.